Figure 1:
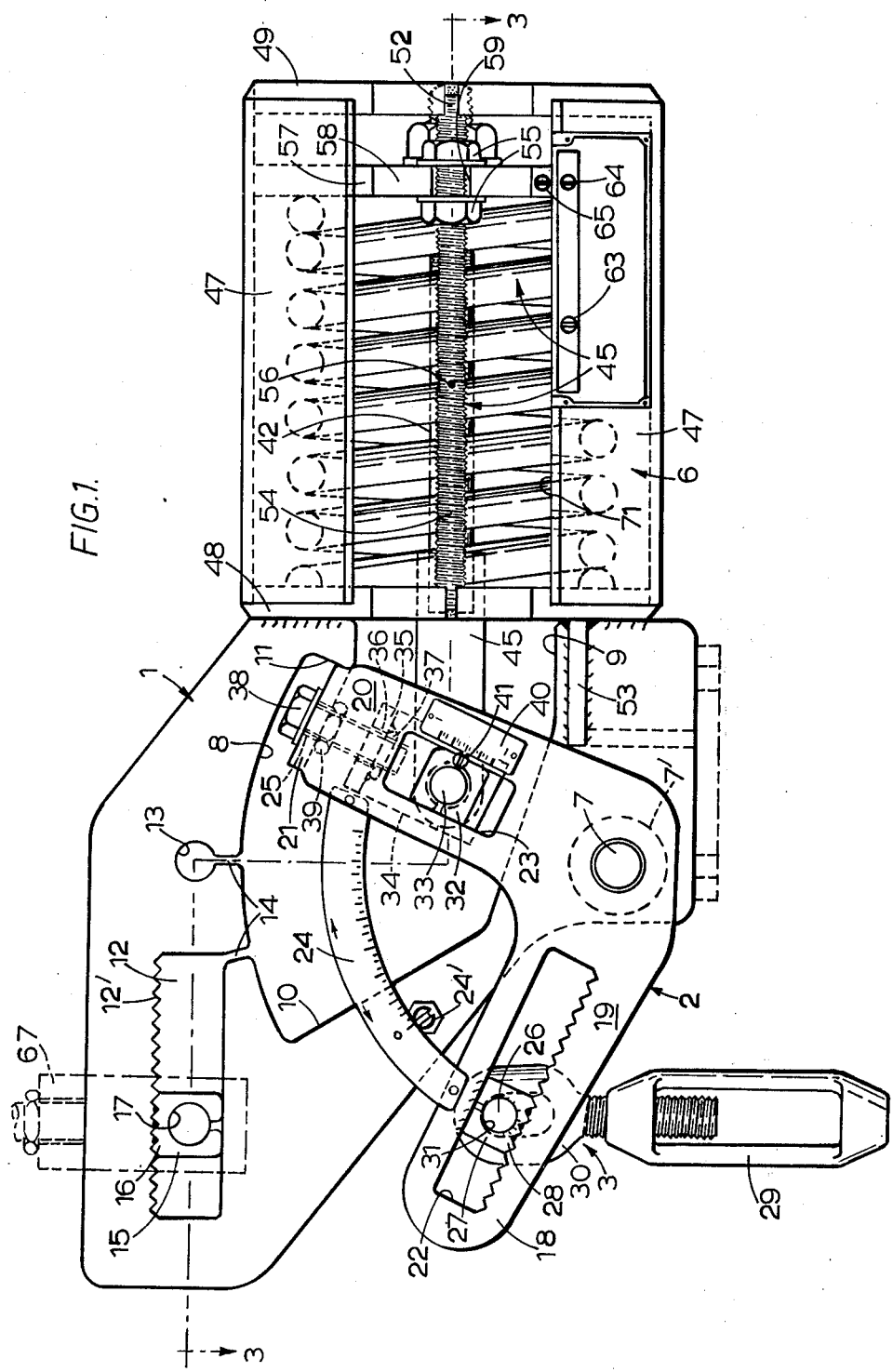

United States Patent [19]
Salter

[11] 4,206,898
[45] Jun. 10, 1980

[54] SPRING SUPPORTS

[75] Inventor: Colin J. Salter, Tividale, England

[73] Assignee: Salter Support Systems, Dudley, England

[21] Appl. No.: 885,220

[22] Filed: Mar. 10, 1978

[30] Foreign Application Priority Data

Mar. 10, 1977 [GB] United Kingdom ............... 10091/77

[51] Int. Cl.² .............................................. F16L 3/00
[52] U.S. Cl. ..................................... 248/561; 248/59; 248/542; 248/543; 248/571; 248/578
[58] Field of Search .................. 248/54 CS, 54 R, 59, 248/324, 58, 571, 574, 575, 578, 561, 543, 542; 267/173, 175, 178

[56] References Cited

U.S. PATENT DOCUMENTS

| | | | |
|---|---|---|---|
| 2,593,502 | 4/1952 | Thomson | 248/54 R |
| 2,936,142 | 5/1960 | Sherburne | 248/54 R |
| 2,949,270 | 8/1960 | Wood | 248/54 CS |
| 2,975,995 | 3/1961 | Sherburne | 248/54 CS |
| 3,167,285 | 1/1965 | Suozzo | 248/54 CS |
| 3,194,523 | 7/1965 | Wright et al. | 248/571 |
| 3,854,684 | 12/1974 | Moore | 248/59 X |
| 3,936,021 | 2/1976 | Salter | 248/54 CS |
| 3,960,350 | 6/1976 | Tardoskegyi | 248/59 X |

FOREIGN PATENT DOCUMENTS

| | | | |
|---|---|---|---|
| 1494320 | 7/1967 | France | 248/54 CS |
| 1226982 | 3/1971 | United Kingdom | 248/54 CS |
| 1229875 | 4/1971 | United Kingdom | 248/54 R |

*Primary Examiner*—Rodney H. Bonck
*Attorney, Agent, or Firm*—Scrivener, Parker, Scrivener and Clarke

[57] ABSTRACT

A spring support of the constant spring force type suitable for supporting pipes in installations where the pipes are liable to move laterally while in use, as for example in the case of pipes through which steam is conveyed, is arranged so that the pipe or other load which the support has to carry in use can be attached to a pivoted lever of the support at various positions at different distances from the pivot. The load is attached through load connecting means to a carrier which is variably positioned on the lever. By adjusting the position of the carrier the turning moment produced on the lever by any one of a range of loads can be arranged to be equal and opposite to the turning moment produced by the spring force which acts on the lever. The facility for adjustment has the manufacturing advantage that a standard form of lever can be produced for supporting a range of loads.

3 Claims, 3 Drawing Figures

SPRING SUPPORTS

This invention relates to spring supports of the kind suitable for supporting pipes which are subject to movement in use caused, for example, by variations in temperature. Pipes for conveying steam are usually supported by such spring supports.

In general, spring supports of this kind operate with either a constant supporting spring force or a variable supporting spring force. The spring force in the former type of spring support remains substantially constant for a range of movement of a pipe supported by the spring support in use, whereas in the latter type the spring force varies according to the movement of the pipe. The present invention is applicable to the constant spring force type of spring support.

Spring supports of the constant spring force type, hereinafter referred to as "of the kind described", comprise a frame, a lever pivoted to the frame, load connecting means attached to the lever and adapted to connect a load to be supported to the lever, a draw bar attached to the lever, and spring means which acts on the draw bar and thereby applies a predetermined force on the lever which counterbalances the load connected to the lever. The common practise has been for the lever to be produced with a fixed position of attachment for the load connecting means which has meant that, for a given spring force, the lever is suitable only for a particular load. For the same spring force but a different load a different lever with a different position of attachment has to be produced. Thus the lever has had to be individually made for the particular load to be supported by the spring support in use. This individual manufacture of the lever is disadvantageous from a production point of view because of the extra work and cost which it entails.

It is the primary object of the present invention to avoid the said disadvantage. With that object in view a spring support of the kind described is provided in which the lever has a carrier variably positioned on it to which the load connecting means is attached and whereby the position of attachment of the load connecting means to the lever can be varied.

By varying the position of the carrier the lever can be adjusted to suit any one of a range of loads for a given spring force acting on the lever. This facility for adjustment enables a standard form of lever to be produced for a range of loads, and accordingly manufacture is simplified.

The carrier may be located in a slot in the lever extending radially of the pivot of the lever, means being provided for retaining the carrier in a variety of positions along the slot. The slot and carrier may have formations, such as teeth, which intermesh to retain the carrier in the positions along the slot. When the carrier has been set in a selected one of the possible positions it can occupy on the lever it may be permanently fixed by welding it to the lever. Alternatively provision may be made for releasably securing the carrier to the lever at an adjusted position. For example, one or more fixing screws may be included in the carrier which can be tightened into engagement with the lever to secure the carrier against movement from any position at which the carrier is set on the lever.

Preferably the lever is a bell-crank lever which is pivoted to the frame at the junction of its two arms. One arm has the carrier mounted on it and the other arm has the draw bar attached to it. The lever may comprise two similar, laterally spaced components which are pivoted about a common axis and are connected for simultaneous operation. With this form of lever the frame may comprise a plate which is straddled by the two spaced components. A connecting or bridge piece between the two components of the lever may pass through an opening in the frame and be angularly movable along the opening. Limits of the movement, and hence of the angular movement of the lever about the pivot, may be determined by abutments in the opening with which the connecting or bridge piece engages. Conveniently the lever and frame are profiled to the desired forms. They may be profiled by a flame cutting process. When the frame is formed by a plate as mentioned above and includes the opening for the connecting or bridge piece of the lever to pass through, the frame may be profiled and the opening formed in it by one continuous flame cutting operation.

The frame may be arranged to be base mounted or to be suspended for use. It may have one or two points of suspension. The, or one, point of suspension is preferably variable in its position to correspond with the variable positioning of the carrier on the lever, it being desirable for the suspension point to be on the vertical axis of the load attached to the lever. The suspension point may be contained in a suspension carrier, similar to the carrier on the lever, which is adjustable in its position on the frame. Again the suspension carrier may be located in a slot in the frame and the carrier and slot may have formations, such as teeth, which intermesh to locate the carrier at an adjusted position in the slot. The carrier may be permanently or releasably secured to the frame when it has been set in a required position. Where there are two suspension points the other one may be fixed.

The position at which the draw bar of the spring support is attached to the lever may also be adjustable. For example, the draw bar may be attached to a connector slidably mounted on the lever and engaged by adjusting screw means on the lever which when turned causes the connector to move along the lever towards or away from the pivot, thereby to adjust the position of the connection of the draw bar to the lever.

Preferably the spring means of the spring support can be locked against movement relative to the frame in a plurality of positions longitudinally of the longitudinal axis of operating movement of the spring means and the draw bar. The spring means may be located in a body rigid with the frame. The body may form part of the frame. Thus the arrangement of the spring means may be substantially in accordance with that which is included in the spring support which is the subject of commonly owned U.S. Patent application Ser. No. 867,590, filed Jan. 6, 1978, and the construction of the spring means and its manner of being locked against movement may be substantially as described in that application.

Figure 2:
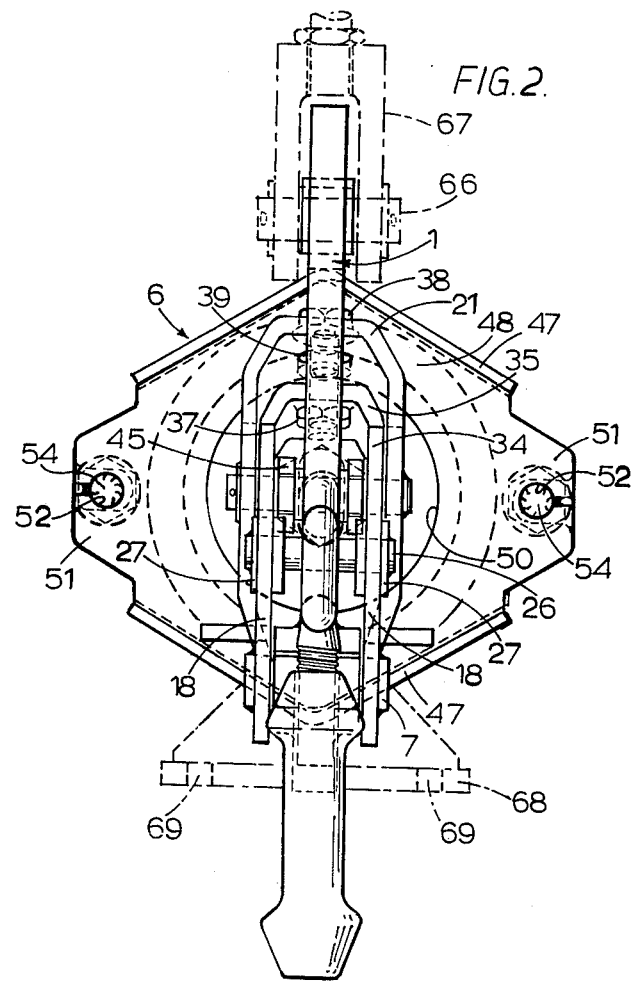
Figure 3:
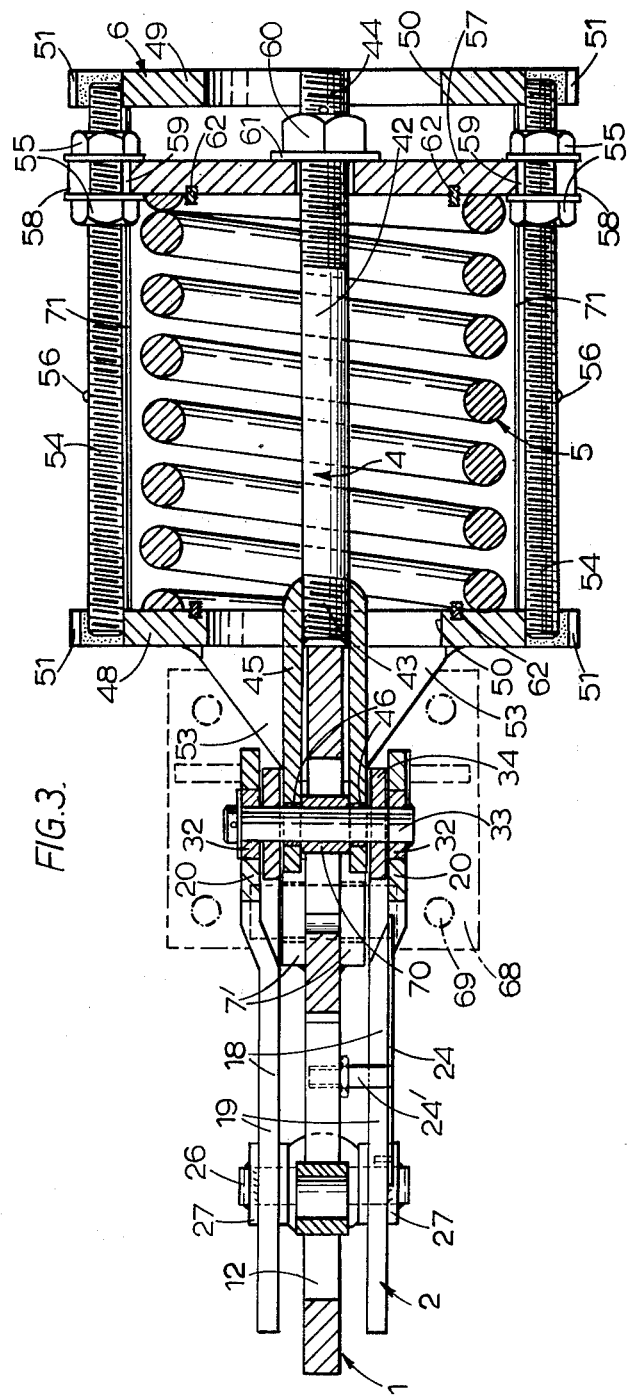

An embodiment of the invention will now be described by way of example with reference to the accompanying drawings in which:

FIG. 1 is a side view of a spring support in accordance with the invention for supporting a pipe in suspension, FIG. 2 is a front view of the spring support, and FIG. 3 is a section on line 3—3 of FIG. 1.

The spring support comprises a frame 1, a lever 2 pivoted about a horizontal axis to the frame, load connecting means 3 for attaching a pipe to be supported to the lever, a draw bar 4 attached to the lever, and a compression spring 5 which acts on the draw bar and is housed in a body 6 rigid with the frame.

The frame 1 comprises a metal plate of generally inverted L-shaped the horizontal limb of which extends forwards. A pivot pin 7 for the lever is rotatably located in a hole near the lower end and towards the front of the vertical limb of the frame 1. In an intermediate part of the frame above the pivot pin 7 there is an arcuate opening 8 which is centred on the axis of the pivot pin and into which an entry 9 leads from a rear edge of the plate. A forward edge 10 of the opening and a rearward edge 11 thereof above the entry 9 extend substantially radially of the pivot pin. In the horizontal limb of the plate above and forwards of the opening 8 is a horizontal slot 12 and behind that is a first top suspension hole 13 the axis of which is in the horizontal plane containing the longitudinal axis of the slot 12 and is directly over the axis of the pivot pin 7. The peripheral shape of the plate, and the entry 9, opening 8, slot 12 and suspension hole 13, are all profile formed in one continuous flame cutting operation. Narrow linking cuts 14 between the opening and the slot and hole enable the continuity in the cutting to be maintained. The pivot pin hole is produced in a separate operation by initially profile forming it and then reaming it out. Annular bosses 7' of similar internal diameter to the pivot pin hole are welded to opposite sides of the frame 1 co-axially with the pivot pin hole.

An upper edge of the slot 12 is formed with teeth 12', and a suspension carrier 15 with complementary teeth 16 and containing a second top suspension hole 17, is fitted in the slot. The suspension carrier is initially able to be located in various positions along the slot, but when it has been set in a required position for use it is subsequently permanently retained in that position by welding it to the top and bottom edges of the slot.

The lever 2 comprises twin, horizontally spaced, bell-crank levers 18 having front and rear arms 19 and 20 respectively and joined together by an integral bridge piece 21 extending between the outer ends of the rear arms 20. The lever straddles the frame 1, the bell-crank levers 18 being mounted on and welded at the junctions of their arms to the pivot pin at opposite sides of the frame, and the bridge piece 21 passes through the opening 8. Angular movement of the lever about the axis of the pivot pin is limited in the forwards direction by abutment of the bridge piece against the forward edge 10 of the opening 8, and in the rearwards direction by abutment of the bridge piece against the rearward edge 11 of the opening. Each bell-crank lever has a slot 22 with a toothed bottom longitudinal edge extending longitudinally along the front arm 19, and a plain-sided slot 23 extending longitudinally along the rear arm 20. The respective slots of the two bell-crank levers are in alignment with one another. An arcuate travel scale 24 extends between and is secured to the arms of each bell-crank lever, the curvature of the scale being centred on the axis of the pivot pin. The kerf in the head of a screw 24' attached to the frame opposite the travel scale 24 acts as an indicator for the scale. A plain hole 25 is formed at the centre of the bridge piece 21.

The lever is made from a single plate which is profile formed in the flat by flame cutting to the outline shape of the two bell-crank levers joined by the integral bridge piece. Also while in the flat, the toothed and plane-sided slots 22,23 the plain hole 25 and holes for the pivot pin are profile formed. The plate is subsequently pressed to the desired finished form.

Profile forming the frame and lever facilitates and reduces the cost of manufacture as compared with forming, for example, by blanking and drilling.

Load connecting means 3 comprises a pin 26 extending between and welded to a pair of pin carriers 27 located in the toothed slots 22 of the bell-crank levers 18 and having teeth 28 which mesh with the teeth of the slot, and a turnbuckle 29 connected to the pin 26 by an eye bolt 30. In use the pipe to be supported is suspended from the turnbuckle 29. The positions of the pin carriers 27 along the slots can initially be varied but when they have been set in the required positions for supporting the pipe they are subsequently permanently retained in those positions by welding them to the front arms 19 of the bell-crank levers.

Profile forming by flame cutting is employed to produce the pin carriers 27, not only as regards their external shapes but also as regards holes 31 in them which receive the ends of the pin 26. Each pin carrier is cut in one continuous operation, a narrow cut linking the periphery with the hole 31. The suspension carrier 15 is made in a similar manner.

Mounted in the plain-sided slots 23 of the rear arms 20 of the bell-crank levers are sliding carriers 32 which are profile formed in similar manner to the pin carriers 27. A connecting pin 33 extends between and is welded to the sliding carriers. The forward end of the draw bar 4 is pivoted to the connecting pin 33. A clevis 34 mounted on the connecting pin straddles the draw bar 4, its web portion 35 being above the draw bar and containing a central plain hole 36. A nut 37 is welded to the underside of the web portion 35 co-axially with the plain hole 36. A headed adjusting bolt 38 freely rotatable in the hole is retained to the bridge piece by a nut 39 fitted and welded to the bolt below the bridge piece, and threadedly engages with the nut 37. Thus rotation of the adjusting bolt moves the clevis 34 and connecting pins lengthwise of the rear arms 20 of the bell crank levers, the movement being guided by the sliding carriers 32, and the distance from the pivot pin 7 of the connection of the draw bar to the lever is accordingly adjusted. An adjustment scale 40 is mounted on each rear arm 30 alongside one longitudinal edge of the slot 23. The kerf in the head of a screw 41 applied to the associated sliding carrier 32 opposite the adjustment scale 40 serves as an indicator.

The draw bar comprises a bar proper 42 having threaded front and rear end portions 43 and 44 respectively and a clevis 45 which is threadedly engaged by and welded to the front end portion 43 of the bar. It is by the clevis 45 that the draw bar is connected to the connecting pin 33 between the limbs of the clevis 34 connected to the bolt 38. The connecting pin passes through selflubricating bearings 46 mounted in the limbs of the draw bar clevis 45, and also through a spacer tube 70 welded between the limbs of that clevis which reduces the bending forces on the connecting pin.

The draw bar extends co-axially into the body 6 which is substantially rhomboidal, its longitudinal axis being horizontal. The body comprises two vertically opposed angle-section, pressed metal, side wall members 47 which extend horizontally between, and are welded to the peripheries of, two generally similar, profile formed front and rear end plates 48 and 49 respectively. Each end plate has a large central aperture 50 and is rhomboidal with two horizontally opposed projecting ends 51 in which are banjo-shaped recesses 52 extending inwardly from their outer edges, the narrower portions of the recesses being adjacent to the outer edges. Front end plate 48 is welded to the rear edge of the frame and the joint is strengthened by gusset plates 53 welded in the angles between the end plate and the frame. The draw bar passes through the central aperture 50 of the front end plate 48. The side wall members 47 are oppositely disposed and vertically spaced apart so that two horizontally opposed openings 71 are defined in the body. The projecting ends 51 protrude through the openings 71. Two members 54 threaded throughout their lengths extend horizontally between the end plates 48,49 and are welded at their ends in the recesses 52 of the projecting ends 51. Each carries two hexagonal nuts 55. A weld blob 56 on the threaded member 54 limits the extent of the threaded movement of the one nut along the member, and the rear end plate 49 limits the movement of the other nut along the threaded member.

Horizontally movable in the body 6 is a piston 57 which is a profile formed metal plate of generally similar shape to the end plates 48,49 with projections 58 which protrude through the openings 71 of the body. Deep U-shaped recesses 59 extend inwardly from the outer edges of the projections 58. The threaded members 54 pass through the recesses 59 with clearance. The nuts 55 on each threaded member are disposed in front of and behind the piston 57. When the nuts are screwed away from the piston, the piston is free to move horizontally along the body, its movement being guided by its projections 58 in the open sides of the body. The extremities of the widest possible range of movement of the piston are defined by the nuts when they are respectively against the weld blobs 56 and the rear end plate 49. When the nuts are tightened against the piston, as shown in FIGS. 1 and 3, the piston is locked against movement in the body. It can be locked at any position between the extremities of the movement of the nuts 55 on the threaded members 54. A retaining nut 60 and washer 61 fitted to the threaded rear end portion 44 of the bar proper 42 of the draw bar 4 behind the piston connects the draw bar to the piston.

The spring 5 is co-axially located in the body 6 between, and bears on, the front end plate 48 and the piston 57. Angularly spaced studs 62 welded to the end plate and piston engage inside the end coils of the spring and retain the spring in co-axial relationship with the body. Two screws 63,64 screwed at horizontally spaced positions into one of the side wall members 47 of the body adjacent one edge of each open side of the body, mark by their kerfs hot and cold load setting positions respectively of the spring according to the position of the piston 57 on the draw bar. An associated indicator 65 is formed by the kerf of a screw screwed into the piston.

In readiness for use, the pin carriers 27 of the load connecting means 3 are adjusted along the toothed slots 22 of the lever 2 to a position such that under the expected load of the pipe to be suspended from the lever a turning moment would be produced equal and opposite to the turning moment on the lever produced by the spring 5 acting through the draw bar 4. Adjustment of the latter moment can be made by altering the distance of the connecting pin carriers 32 on the lever away from the pivot pin 7, and hence the position of the connection of the draw bar to the lever, by means of the adjusting bolt 38. When the pin carriers 27 have been adjusted the suspension carrier 15 is adjusted in its slot 12 to position it directly in line with the axis of the turnbuckle 29 and eye bolt 30. The pin carriers and suspension carrier are subsequently welded to the lever and frame 1 respectively to fix them permanently in the adjusted positions. Until the spring support has been installed for use the piston is preferably locked in the cold load setting position by the nuts 55. This reduces the risk of damage to the apparatus during transportation and installation.

The spring support is suspended from a suitable overhead support for use over the pipe which is to be supported. It may be suspended making use of just the suspension carrier to give a single point of suspension or using the first top suspension hole 13 as well for double point suspension. The connection at the or each suspension point to the overhead support is made by passing through the suspension hole a pin 66 which is attached to a clevis 67 anchored to the support. Alternatively the pin may be attached to a bracket or brackets, links or other suitable means.

If required, the frame may instead be arranged to be bolted directly to the overhead support. The frame may be adapted for base mounting, as indicated by broken lines in the drawings, by fixing a base plate 68 to its bottom edge having holes 69 for bolting it to a suitable anchorage.

After the spring support has been mounted in position the pipe is connected to the lever by suspending the pipe from the turnbuckle 29. This done, the piston 57 is released by screwing the nuts away from it until they are against the weld blobs 56 and the rear end plate 49 respectively. The load of the pipe is then fully counterbalanced by the spring 5. If the piston should deviate from the cold load setting position when it has been released, it can be finely adjusted to bring it back to that position (that is to align the indicator 65 on the piston with the cold load setting screw 64), by altering the position of the connection of the draw bar to the lever by means of the adjusting bolt 38, as previously described.

In the cold load position the kerf of the screw 24' on the frame indicates a zero travel reading on the travel scale 24. Movement of the pipe as its temperature increases pivots the lever relative to the frame and the extent of the movement is indicated directly by the position of the screw 24' relative to the travel scale 24. The counterbalancing spring force remains constant. At the limits of the pivotal movement of the lever its bridge piece abuts against one or other of the edges 10,11 of the opening 8 in the frame. If narrower limits are required the nuts 55 may be appropriately positioned on the threaded members 54 such that the piston abuts against one or other of the nuts and restrains the lever from further pivotal movement relative to the frame before the bridge piece can make contact with the edges of the opening.

If at any time subsequently the lever is required to be locked against movement, as for example whilst the pipe is cleansed or hydraulically tested, this can be readily done, in any position of the lever, by tightening the nuts 55 against the piston 57 so that it and the draw bar are locked.

I claim:
1. A spring support of the constant spring force type comprising:
    a frame having an elongated slot;

a series of locating formations along a longitudinal edge of said frame slot;

suspension means for suspending said frame from a support for use and including a suspension carrier which engages in and is shorter than said frame slot, has key means engageable with said locating formations, is set in said frame slot at any selected one of a plurality of positions along said frame slot determined by said locating formations and is located in said selected position by interengagement of said key means with said locating formations;

a lever pivoted to said frame and having an elongated slot extending radially of said lever pivot and laterally opposite said frame slot;

a series of locating formations along a longitudinal edge of said lever slot;

a load carrier for connecting a load to said lever and which is engaged in and is shorter than said lever slot, has key means engageable with said locating formations of said lever slot, is set in said lever slot at any selected one of a plurality of positions along said lever slot determined by said locating formations of said lever slot and at varying distances from said lever pivot, and is located in said selected position by interengagement of said key means of said load carrier with said locating formations of said lever slot;

a draw bar attached to said lever;

spring means acting on said draw bar and applying on said lever, through said draw bar, a force which counterbalances the load supported by said load carrier on said lever in use;

a component associated with said spring means being connected to said draw bar, movable with said draw bar in the direction of longitudinal movement of said draw bar and normally urged by said spring means away from said lever;

a fixed part on said frame;

locking means which acts between said spring means and said fixed part for locking said spring means against movement in the direction of longitudinal movememt of said draw bar, and thereby effectively locking said draw bar and lever against movement, said locking means comprising an elongated externally threaded member and nuts threadedly engaged with said threaded member, said threaded member being fixed to said fixed part and extending longitudinally of said draw bar and said component having a part thereof freely co-operating with said threaded member, and said nuts being movable on said threaded member at opposite sides of said component part between released positions in which they are spaced from said component part and leave said component, and thereby said spring means, free to move longitudinally relative to said threaded member, and locking positions in which said nuts are tightened against said component part to prevent said component from moving relative to said threaded member and thereby lock said spring means against longitudinal movement.

2. A spring support of the constant spring force type comprising:

a frame having an elongated slot;

a series of locating formations along a longitudinal edge of said frame slot;

suspension means for suspending said frame from a support for use and including a suspension carrier which engages in and is shorter than said frame slot, has key means engageable with said locating formations, is set in said frame slot at any selected one of a plurality of positions along said frame slot determined by said locating formations and is located in said selected position by interengagement of said key means with said locating formations;

a lever pivoted to said frame and having an elongated slot extending radially of said lever pivot and laterally opposite said frame slot;

a series of locating formations along a longitudinal edge of said lever slot;

a load carrier for connecting a load to said lever and which is engaged in and is shorter than said lever slot, has key means engageable with said locating formations of said lever slot, is set in said lever slot at any selected one of a plurality of positions along said lever slot determined by said locating formations of said lever slot and at varying distances from said lever pivot, and is located in said selected position by interengagement of said key means of said load carrier with said locating formations of said lever slot;

a draw bar attached to said lever;

spring means acting on said draw bar and applying on said lever, through said draw bar, a force which counterbalances the load supported by said load carrier on said lever in use;

a component associated with said spring means being connected to said draw bar, movable with said draw bar in the direction of longitudinal movement of said draw bar, and normally urged by said spring means away from said lever, and having parts which project laterally of said spring means and are diametrically opposed with respect to the axis of longitudinal movement of said draw bar;

a fixed part on said frame;

locking means which acts between said spring means and said fixed part for locking said spring means against movement in the direction of longitudinal movement of said draw bar, and thereby effectively locking said draw bar and lever against movement, said locking means comprising two elongated externally threaded members and nuts threadedly engaged with said threaded members, said threaded members being fixed to said fixed part and extending alongside said draw bar at corresponding diametrically opposed positions to said projecting parts of said component, said projecting parts freely cooperating with said threaded members, and said nuts being movable on said threaded members at opposite sides of said projecting parts between released positions in which they are spaced from said projecting parts and leave said component, and thereby said spring means, free to move longitudinally relative to said threaded member, and locking positions in which said nuts are tightened against said projecting parts to prevent said component from moving relative to said threaded members and thereby lock said spring means against longitudinal movement.

3. A spring support according to claim 2 wherein said fixed part is a body which is rigid with said frame and has walls in which are elongated gaps which extend in the direction of longitudinal movement of said draw bar, said draw bar extends into said body, said spring means and component are housed in said body, said projecting parts of said component extend laterally out of said body through said elongated gaps, and said threaded members are fixed to said body externally thereof opposite said gaps.

* * * * *